United States Patent

Huber

[11] 4,058,182
[45] Nov. 15, 1977

[54] ELECTRICALLY DRIVEN VEHICLE, ESPECIALLY PASSENGER MOTOR VEHICLE

[75] Inventor: Manfred Huber, Munich, Germany

[73] Assignee: Bayerische Motoren Werke Aktiengesellschaft, Germany

[21] Appl. No.: 688,572

[22] Filed: May 21, 1976

[30] Foreign Application Priority Data

May 23, 1975 Germany .................. 2522844

[51] Int. Cl.² ............... B60R 21/00; B60L 11/18
[52] U.S. Cl. ............... 180/68.5; 105/50; 180/103 A
[58] Field of Search ........... 180/68.5, 65 R, 103 A; 105/50, 51

[56] References Cited

U.S. PATENT DOCUMENTS

| 435,640 | 9/1890 | Blades | 105/51 |
|---|---|---|---|
| 1,091,583 | 3/1914 | MacGlashan | 105/51 |
| 1,209,962 | 12/1916 | Heath | 105/51 |
| 3,477,538 | 11/1969 | Horn et al. | 180/65 R |
| 3,760,770 | 9/1973 | Weaver et al. | 180/68.5 |
| 3,830,331 | 8/1974 | Piazza | 180/103 A |
| 3,838,745 | 10/1974 | Kappei | 180/68.5 |
| 3,983,952 | 10/1976 | McKee | 105/51 |

Primary Examiner—Joseph F. Peters, Jr.
Assistant Examiner—David M. Mitchell
Attorney, Agent, or Firm—Craig & Antonelli

[57] ABSTRACT

An electrically driven vehicle, especially a passenger motor vehicle with an electric power source taken along in the vehicle which is arranged in the area of the vehicle floor and is connected therewith by way of mounting supports, whereby the latter are provided with means that effect a detachment of the electric power source, especially of a storage battery, from the vehicle in case of an impact of the vehicle beginning with a predetermined impact strength.

23 Claims, 4 Drawing Figures

4,058,182

ELECTRICALLY DRIVEN VEHICLE, ESPECIALLY PASSENGER MOTOR VEHICLE

The present invention relates to an electrically driven vehicle, especially a passenger motor vehicle, with an electric power source taken along in the vehicle, especially with an accumulator or storage battery which is arranged in the area of the vehicle floor and is in connection therewith by way of mounting supports.

Owing to the known slight energy density or energy capacity relative to the size or weight of such electric power sources, the same represent, with an acceptable radius or range of action or operation of the electrically driven vehicle, a not insignificant proportion in the overall weight of the vehicle. Corresponding to this overall weight, the body of the vehicle has to be dimensioned and designed such that its construction provides effective passive safety of the vehicle body, i.e. is an inherently safe construction. This leads disadvantageously to constructions of the vehicle body which are costly as regards material and manufacture.

The present invention is therefore concerned with the task to provide an arrangement of the electric power source taken along in the vehicle, whereby the vehicle body can be designed and constituted more light-weight and more simple in its constructions concerning the passive safety.

The underlying problems are solved according to the present invention in that the mounting supports include a means which effects in case of an impact of the vehicle, beginning with a predetermined impact strength, a detachment or disengagement of the storage batteries from the vehicle.

As a result thereof, in case of an accident, especially in case of a front end impact, the vehicle passengers are endangered by the battery itself as well as by the pouring-out of electrolyte both of which are avoided in an advantageous manner.

Accordingly, it is an object of the present invention to provide an electrically driven vehicle, especially a passenger motor vehicle which avoids by simple means the aforementioned shortcomings and drawbacks encountered in the prior art.

Another object of the present invention resides in electrically driven vehicles, especially in electrically driven passenger motor vehicles, in which the safety of the passengers is safeguarded with respect to the carried-along storage batteries in case of an accident, yet the vehicle construction itself can be realized in a relatively light-weight and simple manner.

A further object of the present invention resides in an electrically driven passenger motor vehicle of the type described above which gives due consideration to the passive safety features of the body, yet reduces the cost of materials and manufacture of the vehicle, particularly as regards the body thereof.

A still further object of the present invention resides in an electrically driven vehicle which greatly minimizes the danger to vehicle passengers by the battery or the electrolyte thereof in case of an accident.

These and other objects, features and advantages of the present invention will become more apparent from the following description when taken in connection with the accompanying drawing which shows, for purposes of illustration only, one embodiment in accordance with the present invention and wherein.

Figure 1:
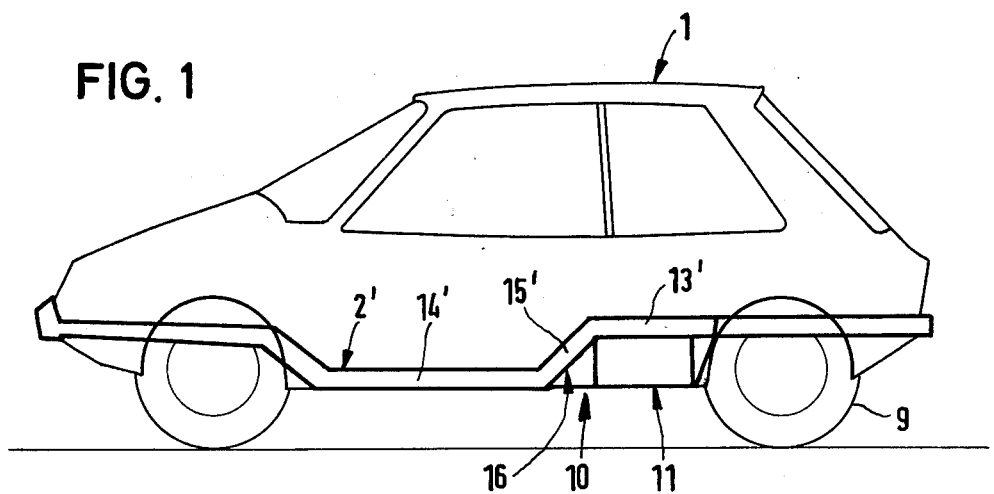
FIG. 1 is a schematic side elevational view of a passenger motor vehicle in accordance with the present invention.
Figure 2:
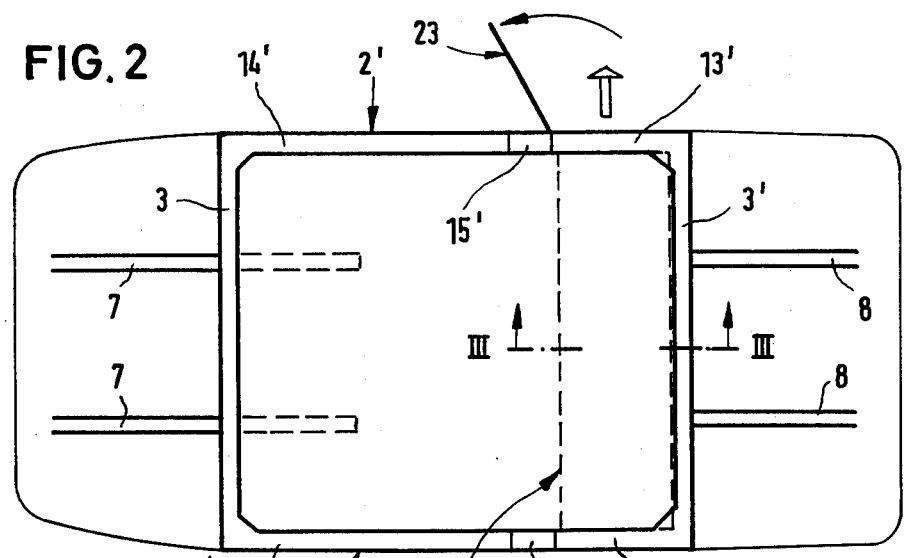
FIG. 2 is a plan view on the floor group of the passenger motor vehicle of FIG. 1.
Figure 4:
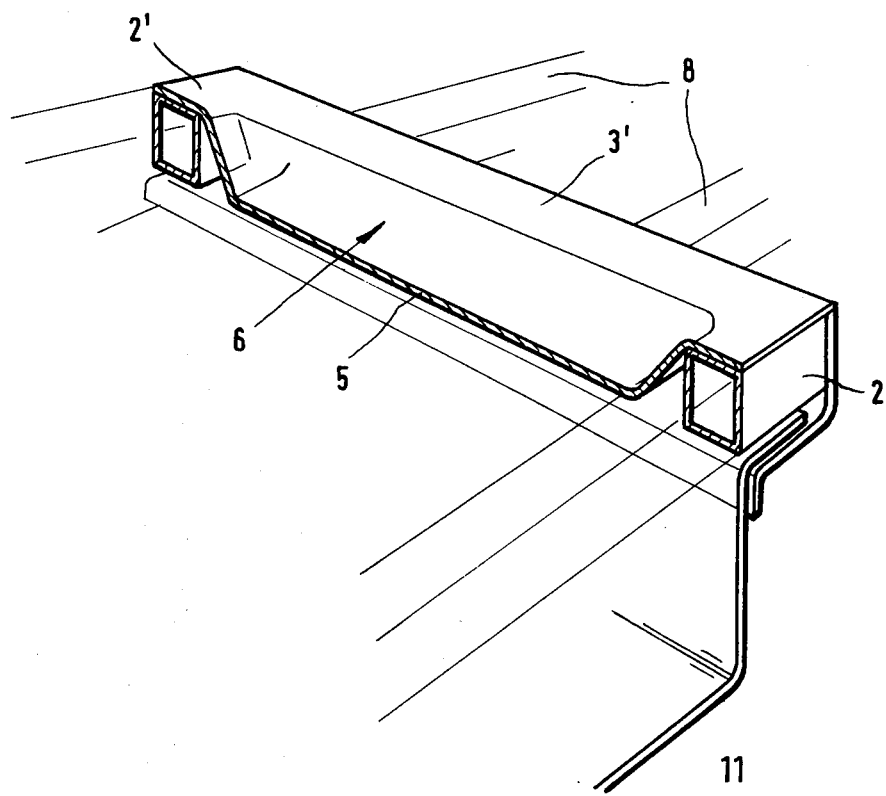
FIG. 4 is a cross-sectional view taken along line IV—IV of FIG. 3 through the floor pan in perspective view.

Referring now to the drawing wherein like reference numerals are used throughout the various views to designate like parts, FIG. 1 shows in schematic illustration a passenger motor vehicle generally designated by reference numeral 1. This passenger motor vehicle 1 may include a self-supporting body of any conventional construction which in its construction includes longitudinal bearers generally designated by reference numeral 2 and 2' in the floor group thereof. These longitudinal bearers 2 and 2' form, according to FIG. 2 together with the cross bearers 3 and 3' a vehicle frame generally designated by reference numeral 4. The frame cooperates corresponding to the showing in FIG. 4 with a sheet-metal floor member 5 for purposes of forming a floor pan generally designated by reference numeral 6. The sheet-metal floor member 5 extends in its extension between the longitudinal bearers 2 and 2' in the plane of the narrow, bottom sides of the longitudinal bearers 2 and 2' facing the road. The connection of the sheet metal floor member 5 with the longitudinal bearers 2 and 2' may take place, as illustrated, by way of the narrow, top sides thereof facing the passenger space (FIG. 4). The floor pan 6 is connected at each end with longitudinal bearers 7 and 8 extending toward the respective vehicle axle.

Figure 3:
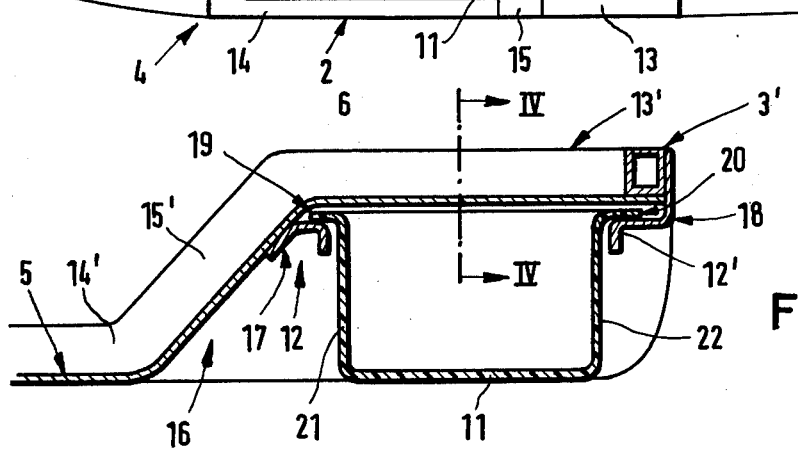
FIG. 3 is a cross-sectional view, on an enlarged scale, taken along line III—III of FIG. 2, through the suspension of the battery trough at the vehicle bottom side in accordance with the present invention.

The floor pan 6 includes a bay or indentation 10 in front of the wheels 9 of the rear axle of the passenger motor vehicle 1. The bay or indentation 10 extends over the entire vehicle width and serves for the arrangement of a storage battery as an electric power source for the electrically driven passenger motor vehicle 1. The accumulator or storage battery is accommodated in a trough 11 which can be seen in FIG. 3. The battery trough 11 is arranged suspended at the floor pan 6 by way of mounting supports 12 and 12'. The manner of the trough arrangement as well as the extension of the bay 10 over the entire vehicle width result in a step-shaped construction of the longitudinal bearers 2 and 2' with one section 13 and 13' each extending above the battery trough 11. Each section 13 and 13' is connected with the longitudinal bearer section 14 and 14' which extends in the driving direction and is arranged lower than the sections 13 and 13' by approximately the amount of the height of the battery trough 11, by way of sections 15 and 15' which are shaped so as to extend obliquely downwardly in the forward direction. The sheet-metal floor member 5 which extends between the longitudinal bearer sections 15 and 15' is constructed following the contour of the aforementioned sections on the side facing the trough or road surface. The section 16 (FIG. 3) of the floor pan 6, which extends over the entire vehicle width obliquely downwardly and forwardly in the driving direction, serves for safely and reliably forcing the battery trough 11 in the direction toward the road surface, which trough is separable from the vehicle by the inertia of the storage battery in case of a front end impact of the passenger motor vehicle beginning with a predetermined impact strength.

In order to achieve a predetermined separation of the battery trough 11 from the passenger motor vehicle 1, the forwardly disposed mounting support 12, as viewed in the driving direction, includes an intentional breaking or rupturing place. The connection of an angle rail 17 as part of the mounting support 12 with the longitudinal bearers 2 and 2' and with the sheet-metal floor member 5 may be constructed as intentional breaking or rupturing place. Preferably, the intentional breaking or rupturing place is to be attained by means of a weakly dimensioned welded connection.

The mounting support 12' includes an angle rail designated by reference numeral 18 which is fixedly connected with the cross bearer 3'. The battery trough 11 cooperates with the angle rails 17 and 18 by way of flanges 19 and 20. The battery trough 11 is made, for example, of reinforced glass fiber synthetic resinous material whereby the flanges 19 and 20 are constructed as angularly bent-off edges of its longitudinal sides 21 and 22 which project from the battery trough 11.

The bay or indentation 10 accommodating the battery trough 11 is covered off on both sides of the passenger motor vehicle 1 by the respective outer body panel. With a passenger motor vehicle 1 intended for right-hand traffic, an opening adapted to be closed off by means of a flap 23 is provided in the outer body panel of the right vehicle side within the area of the battery trough 11. The battery trough 11 which rests slidably on the angle rails 17 and 18 can be pulled out laterally out of the passenger motor vehicle 1 by way of the opening for purposes of examining and servicing work as well as for purposes of changing the storage battery. In order to reduce the friction between the flanges 19 and 20 of the battery trough 11 and the angle rails 17 and 18, the latter are coated with Teflon. The terminal connections of the storage battery, a filling level control for the electrolyte in addition to a refill opening as well as a device for locking the battery trough 11 to the floor pan 6 are arranged at the end face of the battery trough 11 facing the flap 23. However, the terminal connections may also be arranged in the form of automatically engaging plugs at the end face of the battery trough 11 facing the closed outer body panel.

In order to attain a completely satisfactory separation of the storage battery from the passenger motor vehicle 1 for purposes of achieving a favorable crash behavior, the storage battery is connected with the current feed lines by way of tear-off or shear-off bolts.

It is also possible within the scope of the present invention to provide the intended breaking place in one of the flanges and/or in one of the angle rails, such as by providing zones of reduced strength in these components, for example, along their length, rather than providing a weakly constructed welding connection, as described above.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. An electrically driven vehicle with a vehicle floor comprising electric power source means taken along in the vehicle, said electric power source means being arranged within the area of the vehicle floor and depending therefrom by way of mounting support means, characterized in that the mounting support means include a further means which, in case of a vehicle impact of predetermined strength, disconnects the support means and the power source means to effect a detachment of the electric power source means from the vehicle.

2. A vehicle according to claim 1, characterized in that the electric power source means is a storage battery.

3. A vehicle according to claim 1, characterized in that the vehicle is an electrically driven passenger motor vehicle.

4. A vehicle according to claim 1, characterized in that the further means includes an intentional rupturing element.

5. A vehicle according to claim 4, characterized in that the mounting support means includes longitudinally spaced angle rail means arranged at the vehicle floor and extending transversely to the driving direction, and a carrying means carrying the electric power source means and having flange means supported by said angle rail means, and wherein the angle rail means and the associated flange means which is disposed forwardly in the driving direction comprise said rupturing element.

6. A vehicle according to claim 5, characterized in that the intentional rupturing element is realized by means of a weak welded connection between the angle rail means and the vehicle floor.

7. A vehicle according to claim 6, characterized in that the vehicle floor includes a bay extending essentially over the vehicle width in which is arranged the carrying means suspended at the vehicle bottom side by way of the angle rail means, the section of the bay which is disposed forwardly in the driving direction being shaped to extend obliquely downwardly in the forward direction.

8. A vehicle according to claim 7, characterized in that the carrying means includes a trough means, the flange means being formed by angularly bent edge portions of the longitudinal sides of the trough means which project from the trough means.

9. A vehicle according to claim 8, characterized in that the trough means is made of high strength plastic material.

10. A vehicle according to claim 8, characterized in that the trough means is made of reinforced synthetic resinous material.

11. A vehicle according to claim 7, wherein said carrying means comprises a housing means for the electric power source means, characterized in that said flange means are formed on the housing means.

12. A vehicle according to claim 5, characterized in that the intentional rupturing element is placed in one of the flange means.

13. A vehicle according to claim 5, characterized in that the intentional rupturing element is in one of the angle rail means.

14. A vehicle according to claim 5, characterized in that the electric power source means is a storage battery.

15. A vehicle according to claim 14, characterized in that the carrying means includes a trough means, the flange means being formed by angularly bent edge portions of the longitudinal sides of the trough means which project from the trough means.

16. A vehicle according to claim 15, characterized in that the intentional rupturing element is placed in one of the flange means.

17. A vehicle according to claim 15, characterized in that the intentional rupturing element is in one of the angle rail means.

18. A vehicle according to claim 14, wherein said carrying means comprises a housing means for the electric power source means, characterized in that said flange means are formed on the housing means.

19. A vehicle according to claim 18, characterized in that the intentional rupturing element is placed in one of the flange means.

20. A vehicle according to claim 18, characterized in that the intentional rupturing element is in one of the angle rail means.

21. A vehicle according to claim 4, characterized in that the intentional rupturing element is realized by means of a weak welded connection.

22. A vehicle according to claim 1, characterized in that the mounting support means include longitudinally spaced angle rail means arranged at the vehicle floor and extending transversely to the driving direction, and a carrying means carrying the electric power source means and having flange means supported by said angle rail means, and wherein a connection of the angle rail means and the associated flange means which is disposed forwardly in the driving direction with the vehicle floor comprises said further means.

23. A vehicle according to claim 22, characterized in that the vehicle floor includes a bay extending essentially over the vehicle width in which is arranged the carrying means suspended at the vehicle bottom side by way of the angle rail means, the section of the bay which is disposed forwardly in the driving direction being shaped to extend obliquely downwardly in the forward direction.

* * * * *